(12) United States Patent
Blanchard et al.

(10) Patent No.: US 6,528,603 B1
(45) Date of Patent: Mar. 4, 2003

(54) PHOSPHONATE COPOLYMER AND METHODS OF USE

(75) Inventors: Gary J. Blanchard, Okemos, MI (US); Punit Kohli, Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 0 days.

(21) Appl. No.: 09/482,492

(22) Filed: Jan. 13, 2000

Related U.S. Application Data
(60) Provisional application No. 60/115,689, filed on Jan. 13, 1999.

(51) Int. Cl.[7] ............................. C08F 22/40; C08F 30/02
(52) U.S. Cl. ..................... 526/262; 526/274; 526/278
(58) Field of Search .................................. 526/262, 274, 526/278

(56) References Cited

U.S. PATENT DOCUMENTS

| | | | | |
|---|---|---|---|---|
| 3,175,998 A | * | 3/1965 | Rabinowitz | .................. 526/278 |
| 5,430,115 A | * | 7/1995 | Toyooka et al. | ............. 526/262 |

OTHER PUBLICATIONS

Bell, C.M. et al., "New solids and surfaces, via coordination chemistry," Mater. Chem. Phys. 35:225–232 (1993).
Cao, G. et al., "Layered Metal Phosphates And Phosphonates: From Crystals To Monolayers," Acc. Chem. Res. 25:420–427 (1992).
Decher, G. et al., "Buildup of Ultrathin Multilayer Films by a Self–Assembly Process: II. Consecutive Adsorption of Anionic and Cationic Bipolar Amphiphiles and Polyelectrolytes on Charged Surfaces," Bunsen–Ges. Phys. Chem. 95(11):1430–1434 (1991).
Decher, G. et al., "Buildup Of Ultrathin Multilayer Films By A Self–Assembly Process, I Consecutive Adsorption Of Anionic And Cationic Bipolar Amphiphiles On Charged Surfaces," Makromol. Chem. Macromol. Symp. 46:321–327 (1991).
Decher, G. et al., "Creation and structural comparison of ultrathin film assemblies: transferred freely suspended films and Langmuir–Blodgett films of liquid crystals," Thin Solid Films 210/211:504–507 (1992).
Dulcey, C.S. et al., "Deep UV Photochemistry of Chemisorbed Monolayers: Patterned Coplanar Molecular Assemblies," Science 252:551–554 (1991).
Katz, H.E., et al., "Quaterthiophenediphosphonic acid (QDP): A Rigid, Electron–Rich Building Block for Zirconium–Based Multilayers," Chem. Mater. 3:699–703 (1991).
Olson, K.G. et al., "Stereochemical Evidence for Participation of a Donor–Acceptor Complex in Alternating Copolymerization. 1. Model Compound Synthesis," Macromolecules 17:2480–2486 (1984).

(List continued on next page.)

Primary Examiner—D. S. Nakarani
(74) Attorney, Agent, or Firm—Harness, Dickey & Pierce, P.L.C.

(57) ABSTRACT

The present invention provides novel organic copolymers comprising alternating functional groups, wherein one functional group is phosphonate. In one embodiment, the copolymers comprise alternating phosphonate and N-substituted succinimide functional groups. In another embodiment, the copolymers are synthesized from maleimide and vinyl ether monomers, wherein the vinyl ether monomer possesses a pendant phosphonate functionality and the maleimide monomer is an N-substituted maleimide. Methods of synthesizing thin films with the novel organic copolymers, as well as chemical precipitation methods using the novel organic copolymers, are also provided.

11 Claims, 8 Drawing Sheets

OTHER PUBLICATIONS

Olson, K.G. et al., "Stereochemical Evidence for Participation of a Donor–Acceptor Complex in Alternating Copolymerization. 2. Copolymer Structure," Macromolecules 17:2486–2501 (1984).

Putvinski, T.M. et al., "Self–Assembly of Organic Multilayers with Polar Order Using Zirconium Phosphate Bonding between Layers," Langmuir 6:1567–1571 (1990).

Rabinowitz, R., "Phosphorus–Containing Monomers. II. The Synthesis and Polymerization of Dialkyl 2–Vinyloxyethylphosphonates," Org. Chem. 26:5152–5155 (1961).

Shimazaki, Y. et al., "Preparation and Characterization of the Layer–by–Layer Deposited Ultrathin Film Based on the Charge Transfer Interaction in Organic Solvents," Langmuir 14:2768–2773 (1998).

Shimazaki, Y. et al., "Preparation of the Layer–by–Layer Deposited Ultrathin Film Based on the Charge–Transfer Interaction," Langmuir 13:1385–1387 (1997).

Sun, L. et al., "Molecular Interactions between Organized, Surface–Confined Monolayers and Vapor–Phase Probe Molecules: Hydrogen–Bonding Interactions," Langmuir 8:2101–2103 (1992).

Swalen, J.P. et al., "Molecular Monomers and Films," Langmuir 3:932–950 (1987).

Thompson, M.E., "Use of Layered Metal Phosphonates for the Design and Construction of Molecular Materials," Chem. Mater. 6:1168–1175 (1994).

Tillman, A. et al., "Formation of Multilayers by Self–Assembly," Langmuir 5:101–111 (1989).

Yang, H.C. et al., "Growth and Characterization of Metal(II) Alkanebisphosphonate Multilayer Thim Films on Gold Surfaces," J. Am. Chem. Soc. 115:11855–11862 (1993).

Kepley, L.J. et al., "Selective Surface Acoustic Wave–Based Organophosphonate Chemical Sensor Employing A Self–Assembled Composite Monolayer: A New Paradigm For Sensor Design," Anal. Chem. 64:3191–3193 (1992).

Kim, H. et al., "Characterization Of Zirconium Phosphate/Polycation Thim Films Grown By Sequential Adsorption Reactions," Chem. Mater. 9:1414–1421 (1997).

Kohli, P. et al., "Assembly of Covalently–Coupled Disulfide Multilayers On Gold," J. Am. Chem. Soc. 120:11962–11968 (1998).

Kohli, P. et al., "Co–Polymerization of Maleimides and Vinyl Ethers: A Structural Study," Macromolecules 31:5681–5689 (1998).

Kumar, A. et al., "The Use of Self–Assembled Monolayers and a Selective Etch To Generate Patterned Gold Features," J. Am. Chem. Soc. 114:9188–9189 (1992)).

Lee, H. et al., "Adsorption of Ordered Zirconium Phosphonate Multilayer Films on Silicon and Gold Surfaces," J. Phys. Chem. 92:2597–2601 (1988).

Lee, H. et al., "Inorganic Analogues of Langmuir–Blodgett Films: Adsorption of Ordered Zirconium 1,10–Decanebisphosphonate Multilayers on Silicon Surfaces," J. Am. Chem. Soc. 110:618–620 (1988).

Li, D. et al., "Chromophoric Self–Assembled Multilayers. Organic Superlattice Approaches To Thin–Film Nonlinear Optical Materials," J. Am. Chem. Soc. 112:7389–7390 (1990).

Liu, Y. et al., "Multilayer Dendrimer—Polyanhydride Composite Films on Glass, Silicon, and Gold Waters," Angew. Chem. Int. Ed. Engl. 36:2114–2116 (1997).

McKenna, C.E. et al., "Functional Selectivity in Phosphonate Ester Dealkylation with Bromotrimethysilane," J. Chem. Soc., Chem. Comm. 739 (1979).

Metzger, R.M. et al., "Monolayers and Z–Type Multilayers of Donor—Acceptor Molecules with One, Two, and Three Dodecoxy Tails," Langmuir 6:350–357 (1990).

Netzer, L. et al., "A New Approach To Construction Of Artificial Monolayer Assemblies," J. Am. Chem. Soc. 105:674–676 (1983).

* cited by examiner

PHOSPHONATE COPOLYMER AND METHODS OF USE

This application claims the benefit of Provisional Application Ser. No. 60/115,689 filed Jan. 13, 1999.

SPONSORSHIP

This invention was made with Government support under Grant Number CHE9508763 awarded by the National Science Foundation. The Government has certain rights in the invention.

FIELD OF THE INVENTION

This invention relates generally to novel organic copolymers and methods of use thereof, and more particularly, to novel phosphonate copolymers with alternating functional groups and their use in metal chelation and in forming multilayer structures.

BACKGROUND OF THE INVENTION

The design and synthesis of thin films and chemically modified surfaces has been an area of intense research activity because of the potential utility of these structures. Various applications including optical second harmonic generation, (Katz, H. E. et al., *J. Am. Chem. Soc.* 112:7389 (1990)) chemical sensing (Kepley, L. J. et al., *Anal. Chem.* 64:3191 (1992)), electrical or environmental isolation (Swalen, J. P. et al., *Langmuir* 3:932 (1987)), electronic rectification (Metzger, R. M. et al., *Langmuir* 6:350 (1990)), and photoreactivity (Dulcey, C. S. et al., *Science* 252:551 (1991); Calvert, J. M. et al., *Thin Solid Films* 210/211:359 (1992); Kumar, A. et al., *J. Am. Chem. Soc.* 114:9188 (1992)) have been either proposed or demonstrated, underscoring the importance of materials advances in this area. Of particular significance to interfacial materials and thin films is the ability to grow layered materials where there is good control over the layer thickness and uniformity. Layer-by-layer deposition of films can provide spatial resolution and directionality, and both of these structural properties can be critical to the macroscopic properties of the system. To achieve controlled, layer-by-layer growth requires the development of efficient and robust means of connecting individual layers. Several different techniques have been devised for linking individual molecular layers, including covalent (Netzer, L. et al., *J. Am. Chem. Soc.* 105:674 (1983); Tillman, A. et al., *Langmuir* 5:101 (1989); Liu, Y. et al., *Angew. Chem. Int. Ed. Engl.* 36:2114 (1997); Kohli, P. et al., *J. Am. Chem. Soc.* 120:11962 (1998)), ionic—covalent (Lee, H. et al., *J. Am. Chem. Soc.* 110:618 (1988); Lee, H. et al., *J. Phys. Chem.* 92:2597 (1988); CAD, G. et al., *Acc. Chem. Res.* 25:420 (1992); Putvinski, T. M. et al., *Langmuir* 6:1567 (1990); Katz, H. E., et al., *Chem. Mater.* 3:699 (1991); Yang, H. C. et al., *J. Am. Chem. Soc.* 115:11855 (1993); Thompson, M. E., *Chem. Mater.* 6:1168 (1994)), coordination (Bell, C. M. et al., *Mater. Chem. Phys.* 35:225 (1993)), charge-transfer (Shimazaki, Y. et al., *Langmuir* 13:1385 (1997); Shimazaki, Y. et al., *Langmuir* 14:2768 (1998)), hydrogen bonding (Sun, L. et al., *Langmuir* 8:2101 (1992)) and alternate adsorption of oppositely charged polyelectrolytes. Decher, G. et al., *Chem. Macromol. Symp.* 46:321 (1991); Decher, G. et al., *Bunsen-Ges. Phys. Chem.* 95:1430 (1991); Decher, G. et al., *Thin Solid Films* 210/211:504 (1992). Many of these methods are well suited to the deposition of multilayers of small molecules and can be used for the deposition of polymers under certain circumstances. For several of the linking methods, however, the stability of the resulting structures is limited under conditions of high temperature or solvent exposure. Only the approaches that use covalent or strongly ionic interlayer linking chemistry can withstand thermal and solvent attack.

Polymers containing anionic functional groups can also play an important role in metal reclamation and water purification by chelating metals to remove them from media such as waste water. The most viable chemical techniques for treatment of metal bearing effluents include electrolytic deposition, metallic replacement, ion exchange, chemical reduction and chemical precipitation. While electrolytic deposition, metallic replacement, ion exchange and chemical reduction are all reasonably effective, chemical precipitation is believed to be the most effective method for metal removal from waster water effluents. Two general chemical precipitation methods are known for removing heavy metals from waste water—hydroxide precipitation and sulfide precipitation. Hydroxide precipitation has limitations, however, due to high solubility and amphoteric properties of metal hydroxides. In addition, the technique is not effective in the presence of chelating agents, which are commonly used in metal finishing operations. Sulfide precipitation is an alternate method which does not have the shortcomings associated with hydroxide precipitation, however three additional problems exist with sulfide precipitation. These are the necessity to control excess sulfide ion, the necessity to control pH to avoid the production of toxic and noxious hydrogen sulfide gas, and the problems associated with the filtration of the very fine metal sulfide particles.

It would therefore be desirable to provide materials that could be used for the synthesis of thin films and chemically modified surfaces. It would also be desirable to provide materials that produce uniform layers. It would further be desirable to provide methods of synthesizing thin films where the thickness of the layers could be controlled. It would also be desirable if the thin films formed from such materials and methods are stable, especially at high temperatures and/or solvent exposure.

It would further be desirable to provide materials that could chelate metals to sequester or recover such metals. It would also be desirable for such materials to be polychelants, increasing their efficiency. It would further be desirable to provide methods of sequestering or recovering metals that are less hazardous than the current chemical precipitation methods.

SUMMARY OF THE INVENTION

The present invention provides novel organic copolymers comprising alternating functional groups, wherein one functional group is phosphonate. In one embodiment, the copolymers of the present invention comprise alternating phosphonate and N-substituted succinimide functional groups. In another embodiment, the copolymers are synthesized from maleimide and vinyl ether monomers. In yet another embodiment, the vinyl ether monomer possesses a pendant phosphonate functionality and the maleimide monomer is an N-substituted maleimide.

The present invention also provides methods for producing polymer multilayer structures using the novel alternating copolymers. In one embodiment, multilayer structures are produced by layer-by-layer deposition of the alternating copolymers on a substrate using metal-phosphonate interlayer linking chemistry. The thickness of the layers may be controlled by the size of the substituent of the N-substituted maleimide of the alternating copolymer, wherein the thickness of the layers is proportional to the size of the substituent. The methods provided herein produce uniform layers.

The present invention further provides novel methods for metal chelation and metal reclamation using the novel alternating copolymers. In one embodiment, the anionic phosphonate groups chelate metals. In another embodiment, the alternating copolymer further comprises an acid functionality on the maleimide. Such novel copolymers produce a more efficient chelator.

Additional objects, advantages, and features of the present invention will become apparent from the following description and appended claims, taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
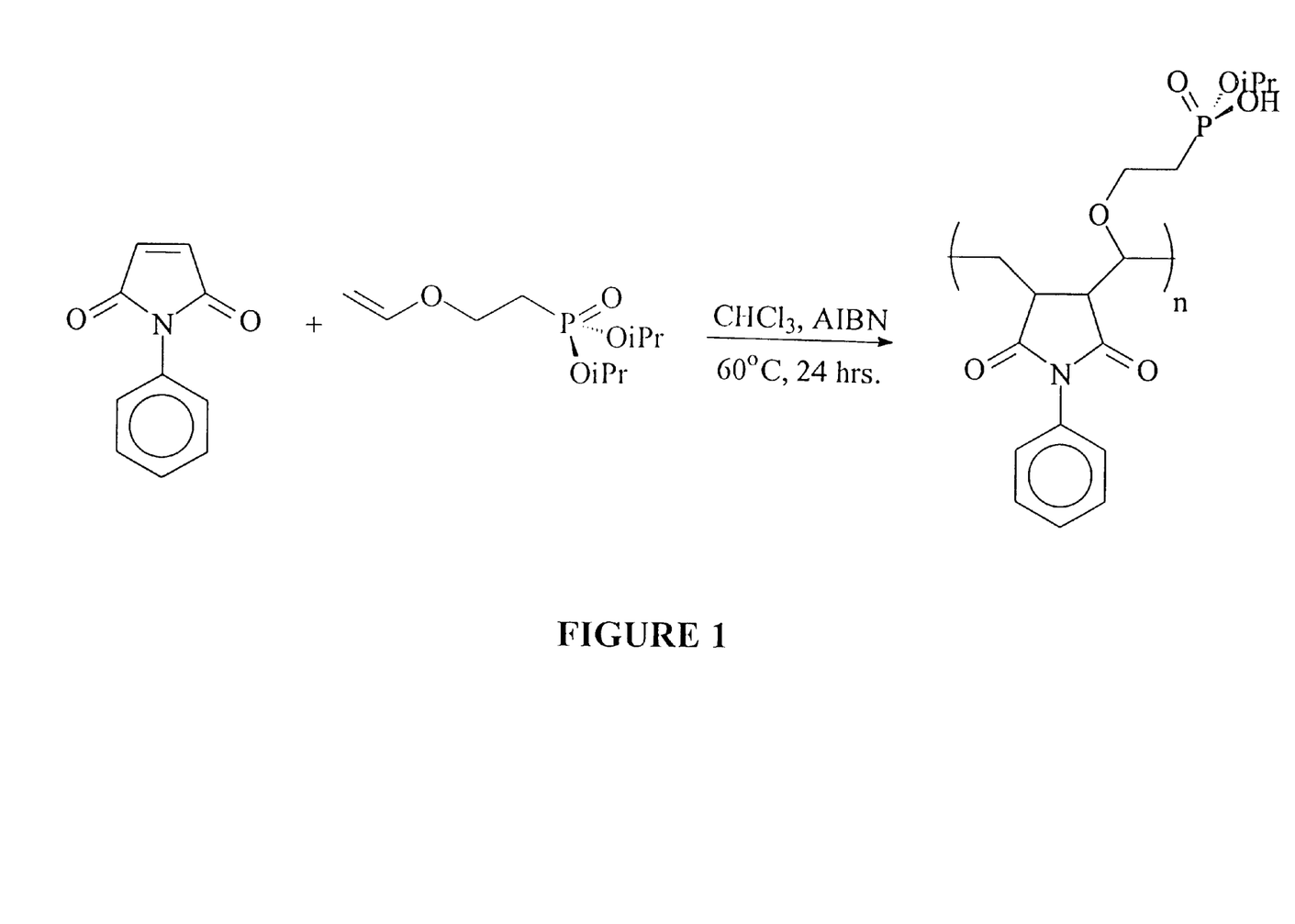
FIG. 1 is a schematic representation of the synthetic route for poly(NPM-VEP)

The present invention provides novel organic copolymers comprising alternating functional groups, wherein one functional group is an N-substituted succinimide and the other is a phosphonate group. In one embodiment, the copolymers are synthesized from N-substituted-maleimides and vinyl ether monomers possessing a pendent phosphonate functionality. The general formula of the copolymer is:

where $m \geq 0$, $n \geq 1$, R' is a hydrogen, alkyl, aryl, substituted aryl, or acid moiety and R is any protecting group. Preferably, m is 0 to 4, n is 1 to 5, R' is an aryl or substituted aryl and R is any protecting group that can be removed by treatment with trimethylsilane. More preferably, m=0, n=2, R' is chosen from the group consisting of phenyl, biphenyl, and benzoic acid and R is chosen from the group consisting of methyl, ethyl or isopropyl. As a non-limiting example, FIG. 1 illustrates the reaction between N-phenyl-maleimide and (2-vinyloxy)ethylphosphonate to produce the polymer poly(N-phenylmaleimide-(2-vinyloxy)ethylphosphonate.

In another embodiment, the vinyl ether phosphonate monomers are formed by reacting a vinyl ether with phosphite at 170° C. for 5 days. The vinyl ether has the general formula $X(CH_2)_nO(CH_2)_mCH=CH_2$ where $n \geq 1$ and $m \geq 0$. X is a leaving group, preferably a halogen chosen from the group consisting of Cl, Br and 1. It will be appreciated by those skilled in the art that when n is small (i.e., $\leq 3$), chlorine is a better leaving group. When the alkyl chain is longer and there is a greater distance between the oxygen and the leaving group, Br and I are preferred as leaving groups. The phosphite has the general formula $P(OR)_3$, wherein R is a protecting group that can be removed by methods known to those skilled in the art. Preferably, R is a protecting group removed by treatment with trimethylsilane and more preferably R is methyl-, ethyl- or isopropyl.

In yet another embodiment, the other functional monomer of the alternating copolymer is an N-substituted maleimide (N-R'-maleimide). The N-substituted group can be a hydrogen, an alkyl, an aryl, a substituted aryl, or an organic acid moiety. The choice of substituent will determine the thickness of the final polymer layer. N-methylmaleimide will produce a very thin layer while N-phenylmaleimide will produce a thicker layer and N-biphenylmaleimide will produce an even thicker layer. Preferably the N-R'-maleimide will be an aryl- or substituted aryl-maleimide and more preferably will be N-phenyl, N-(p-benzoic acid)-maleimide or N-biphenyl-maleimide.

In a further embodiment, the alternating copolymers of the present invention are prepared by radical copolymerization of the vinyl ether phosphonate and the N-R'-maleimide. Any radical initiator known in the art can be used. Preferably the initiator will be AIBN. The copolymer is synthesized by reacting equimolar amounts of the maleimide and vinyl ether phosphonate in $CHCl_3$ at 60° C. under an $N_2$ atmosphere for approximately 18 hours using AIBN as the initiator. The copolymer product can be precipitated out of the reaction mixture by cooling the reaction and adding a precipitation solvent such as methanol.

The alternating copolymers of the present invention can be used to form thin films and chemically modified surfaces. Such films and modified surfaces have widely varied applications such as, but not limited to, optical second harmonic generation, chemical sensing, electrical or environmental isolation, electronic rectification and photoreactivity. The films formed from the alternating copolymer of the present invention combine the advantages of metal phosphonate interlayer linking chemistry with the physical robustness of vinylether-maleimide alternating copolymers.

The thin films may be formed by layer-by-layer deposition of the alternating copolymers of the present invention on oxidized silicon and silica substrates using metal-phosphonate interlayer linking chemistry. The deposition of polymer layers is shown schematically in FIG. 2. Layer-by-layer growth using the copolymers of the present invention offers better control over the thickness of ultrathin polymer layers, on the order of tens of Å. The formation of macroscopic defects such as bubbles or pinholes is minimized and the layers formed can be both chemically and thermally robust. To grow the layers, the silicon substrate is treated to produce a native oxide layer. The resulting silanol groups are phosphorylated, followed by hydrolysis and metalation. The silane-based chemistry typically used to prepare the surface are not required for forming the layers in the methods of the present invention. The metal can be any metal that binds to phosphonates. Preferably, the metal is selected from the group consisting of zirconium (Zr), hafnium (Hf), copper (Cu), zinc (Zn), yttrium (Y) and mixtures thereof and more preferably, the metal is zirconium. The phosphonate moiety of the alternating copolymer is partially deprotected by methods useful for removing the protecting groups involved. The partially deprotected copolymer is then contacted to the metal layer of the substrate. The metal forms a strong complex with the phosphinic acid groups of the copolymers while the remaining, protected phosphonates do not interact. After the first copolymer layer is deposited, the remaining phosphonate groups are deprotected, treated with metal to form additional metal phosphonate complexes. Additional layers are then added in the same manner as the first layer. It will be appreciated that the number of layers will depend on the desired final thickness of the film and the application it will be used in.

Formation of thin films with the alternating copolymers of the present invention using the methods described herein offers better control over thickness of the ultrathin polymer layers. The choice of substituent R' in N-R'-maleimide also effects the thickness of the layers. The larger and/or bulkier the group, the thicker the layer. For example, N-phenyl-maleimide yields layers that are 16 Å thick, while with N-biphenyl-maleimide, the layers are 31 Å. A substituent such as p-benzoic acid that is larger than the phenyl group but smaller than biphenyl yields layers that are, as expected, intermediate in thickness at 21 Å as compared to phenyl or biphenyl. It will be appreciated that layer thickness can also be controlled by varying the length of the vinylether phosphonate. As m and/or n increases, the thickness of the layers will also increase.

In a further embodiment, films composed of the alternating copolymer of the present invention can be conducting films depending on the choice of metal. If a conducting metal, such as copper, is used to produce the films, the films can act as conducting films. Such a material would be useful for films and coatings for the electronics industry.

Thus, the present invention provides methods of producing polymer multilayer structures, comprising the steps of contacting a partially deprotected alternating copolymer with a metalated phosphorylated substrate to form a layer, deprotecting any remaining phosphonate groups of the alternating copolymer layer and contacting the deprotected phosphonates with a metal to form a metal-copolymer complex. Additional layers can be formed by repeating the steps of contacting a partially deprotected alternating copolymer, deprotecting the remaining protected phosphonates and contacting the deprotected phosphonates with additional metal.

In another embodiment, the alternating copolymer of the present invention can be used as a metal chelator in applications such as, but not limited to, metal reclamation, water treatment, and medical diagnostic imaging. The phosphonate groups of the copolymer are excellent metal chelators. Additionally, another organic acid moiety can be introduced into the copolymer in the maleimide group. Substituents such as aryl carboxylic acids (i.e., benzoic acid), alkyl carboxylic acid (i.e., acetic acid, propionic acid) can be used to increase the metal binding capacity of the copolymers. For use in metal reclamation and water treatment, the copolymer complexes the metals and the complex may be removed by filtration or precipitation. The metal may then be released from the polymer by resuspending the polymer and lowering the pH. Metal reclamation and water treatment methods are well known to those skilled in the art.

The present invention therefore provides methods of chelating metals, comprising the steps of contacting the copolymer of the present invention with a metal-containing medium under conditions favorable to copolymer-metal complex formation, isolating the copolymer-metal complex from the medium, and dissociating the metal from the copolymer.

The foregoing and other aspects of the invention may be better understood in connection with the following examples, which are presented for purposes of illustration and not by way of limitation.

SPECIFIC EXAMPLE 1

Synthesis and Characterization of Poly(N-phenylmaleimide-(2-vinyloxy)ethylphosphonate) and Poly(N-biphenylmaleimide-(2-vinyloxy)ethylphosphonate)

The alternating copolymers of N-phenylmaleimide (NPM) and (2-vinyloxy)ethylphosphonate (VEP) and of N-biphenylmaleimide (NBM) and VEP were prepared by radical copolymerization using AIBN as the initiator. Kohli, P. et al., *Macromolecules* 31:5681 (1998); Olson, K. G. et al., *Macromolecules* 17:2480 (1984); Olson, K. G. et al., *Macromolecules* 17:2486 (1984). The reaction between NPM and VEP is shown in FIG. 1 and is the same save for the maleimide monomer for poly(NBM-VEP) synthesis. No monomer homopolymerization was observed under these reaction conditions. VEP is prepared by the reaction of excess tri(isopropyl)phosphite with 2-chloroethylvinylether at 170° C. for 5 days in an argon atmosphere. Rabinowitz, R., *Org. Chem.* 26:5152 (1961). Distillation of the product yields ~72% VEP. $^1$H NMR (300 MHz, d-CHCl$_3$): δ 1.3 (d, 12H of isopropyl), 2.1 (m, 2H of CH$_2$ adjacent to phosphonate group), 3.9 (m, 2H adjacent to oxygen of vinyl ether), 4.0 and 4.2 (dd, 1H each of vinyl group), 4.6 (m, 2H of isopropyl group), 6.3 (dd, 1H from vinyl group adjacent to oxygen).

The monomer N-phenylmaleimide was purchased from Aldrich Chemical Co. and used after recrystallization from hexanes. N-biphenylmaleimide was synthesized according to the following procedure. 4-Phenylaniline (1 g) was dissolved in CHCl$_3$ (10 mL) and added drop-wise to a solution of maleic anhydride (0.71 g) in CHCl$_3$ (5 mL) over a period of 1 hour. The reaction was allowed to stir for an additional 2 hours. The resulting amic acid appeared as a bright yellow precipitate and was separated from the supernatant by filtration. Biphenylamic acid (0.4 g) was cyclized by heating to ~60° C. for 2 hours in a solution of 6.4 mL of acetic anhydride and 0.072 g of anhydrous sodium acetate. The resulting solution was cooled to room temperature and added to 50 mL of ice water. The N-biphenylmaleimide product was filtered, dried and recrystallized from hexanes (80% yield). $^1$H NMR (300 MHz, $d_6$DMSO): δ 7.20 (2H, s), δ 7.46 (5H, m), δ 7.70 (2H, d) δ 7.77 (2H, d).

The copolymer was synthesized by reacting equimolar amounts of the maleimide and VEP in $CHCl_3$ at 60° C. under a $N_2$ atmosphere for ~18 hours using AIBN as the initiator. $^1$H NMR (300 MHz, $d_6$-DMSO): δ 1.0–1.4 (6H, VEP isopropyl groups), δ 1.8–2.2 (2H, VEP $CH_2$ adjacent to phosphonate group), δ 3.0–4.0 (2H, succinimide ring+2H adjacent to vinyl ether oxygen+2H from ethyl group), δ 4.3–4.7 (1 tertiary isopropyl H+1 tertiary H adjacent to oxygen), δ 7.0–7.4 (5H, phenyl ring). $^{13}$C NMR (d-$CHCl_3$, 75.46 MHz): δ 24, 29.5, 38–42, 46–54, 71, 77, 125–135, 174–180.

Under the experimental conditions used, statistically one of the isopropyl groups terminating each phosphonate oxygen is hydrolyzed to yield a hydroxyl group during the course of the polymerization. This displacement is likely due to the presence of HCl formed in $CHCl_3$ solution by AIBN. GPC characterization of the resulting NPM-VEP polymer shows $M_n$=7200, $M_w$=10800, yielding a polydispersity of 1.5. The reaction of either poly(NPM-VEP) or poly(NBM-VEP) with bromotrimethylsilane in anhydrous $CH_2Cl_2$ at room temperature for ~2 hours yields a polymer that is partially hydrolyzed, making it useful for the formation of multilayer assemblies. McKenna, C. E. et al., *J. Chem. Soc., Chem. Comm.* 739 (1979).

SPECIFIC EXAMPLE 2

Formation and Characterization of Layered Structures

Figure 2:
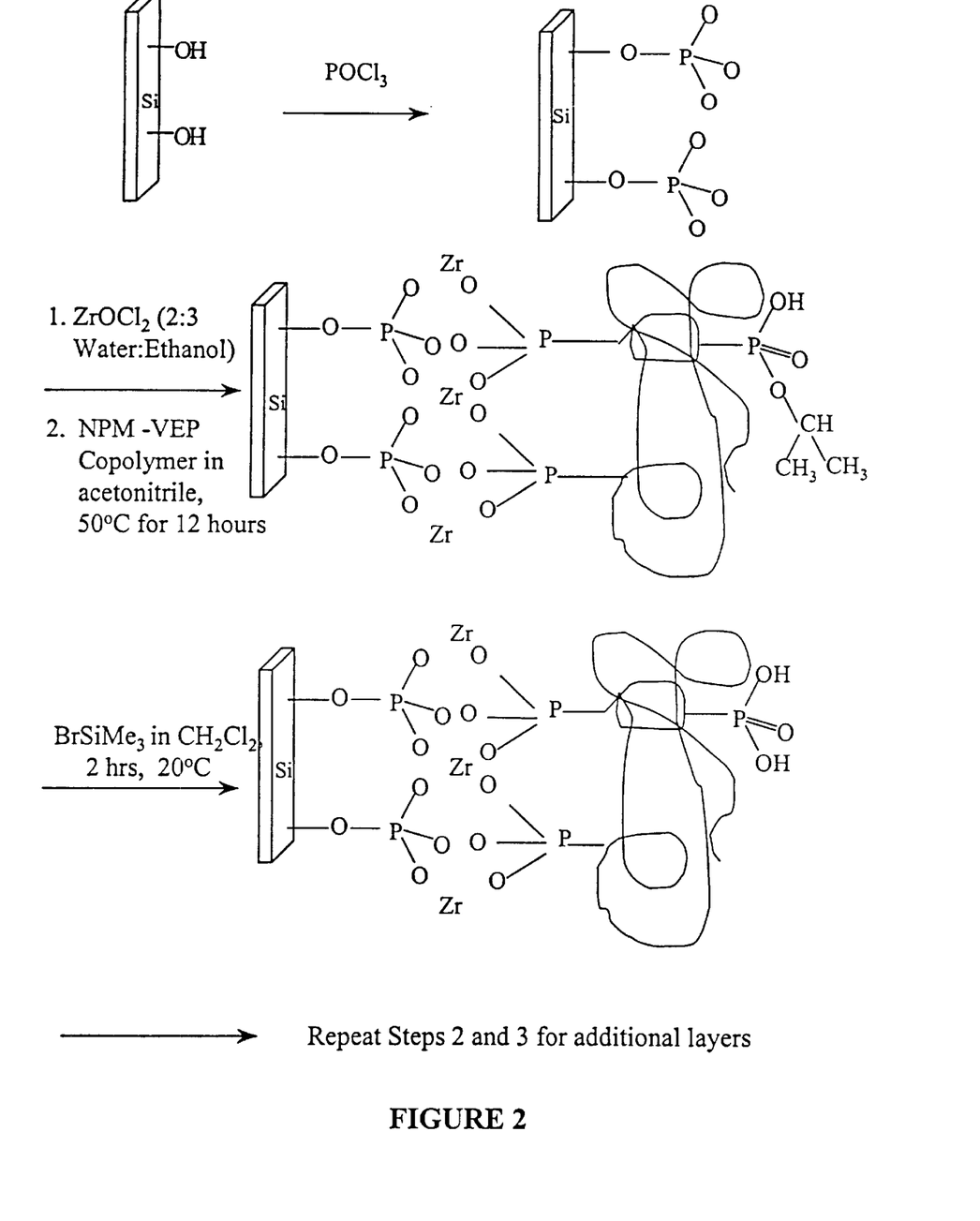
FIG. 2 is a schematic representation of the layer growth of poly(NPM-VEP)

The deposition of polymer layers is shown schematically in FIG. 2. For ellipsometry measurements Si substrates were used. To grow these layered materials, the silicon substrate was treated to produce a ~15 Å thick native oxide layer. The resulting silanol groups were phosphorylated using $POCl_3$ in dry acetonitrile, followed by hydrolysis and zirconation in $ZrOCl_2$ solution. This procedure is a departure from other reports on the preparation of Si and $SiO_x$ substrates for zirconium/polymer (ZP) layer growth. Typically the bare substrates are oxidized (Si) and hydrolyzed (Si and $SiO_x$) in the same manner set forth herein. Subsequent to the preparation of a hydrolyzed $SiO_x$ layer, the typical procedure would be treatment with either triethoxyaminopropylsilane or methoxydimethylaminopropylsilane to yield an aminated surface. Reaction of the amino-terminated surface with $POCl_3$ and $H_2O$ produces an aminophosphonic acid surface. In the present invention, the surface silanol groups were directly treated with $POCl_3$ and then $H_2O$ to produce a surface with the same properties as that achieved with the more widely used silane-based chemistry.

Figure 3A:
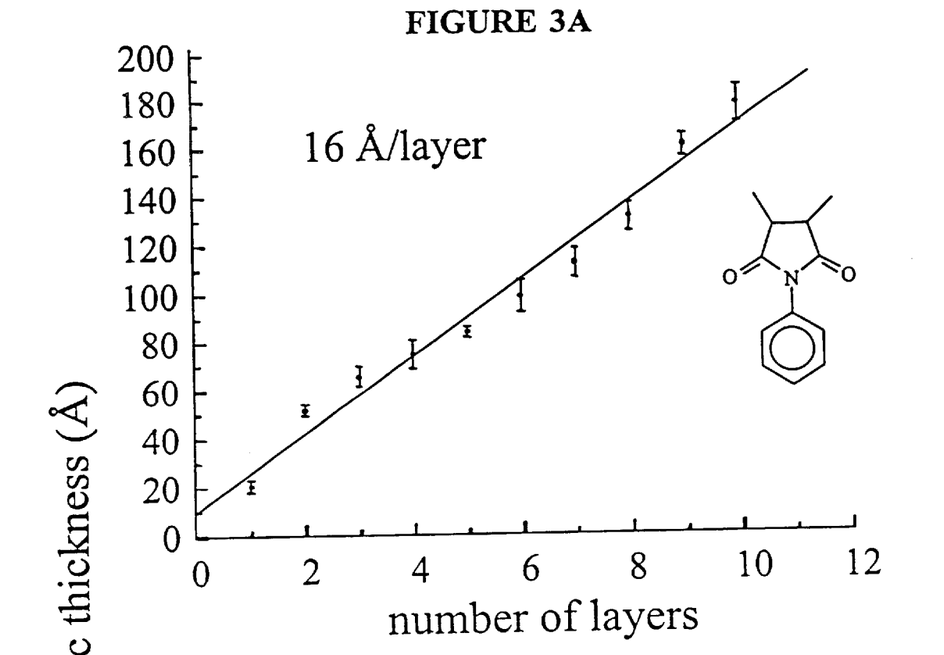
FIG. 3A is a graph showing the ellipsometric data for ten layers of poly(NPM-VEP)
Figure 3B:
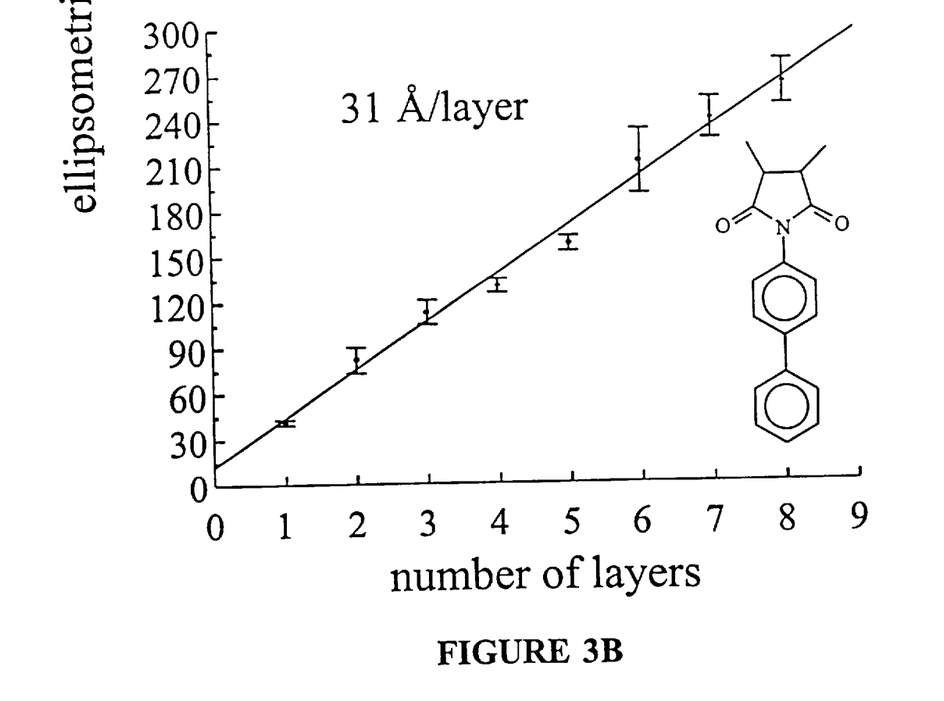
FIG. 3B is a graph showing the ellipsometric data for eight layers of poly(NBM-VEP)

Polymer layers were formed on the primed and zirconated substrate by adsorption of either poly(NPM-VEP) or poly(NBM-VEP) from acetonitrile at 50° C. over ~12 hours. X-ray photoelectron spectroscopic (XPS) data suggest that $Zr^{4+}$ forms a strong complex with two phosphonic acid groups of the copolymers while the remaining, partially hydrolyzed phosphonates are used in the formation of the next layer after displacing the remaining isopropyl groups with bromotrimethylsilane (FIG. 2). This procedure has been used to form ten layers of poly(NPM-VEP) and eight layers of poly(NBM-VEP) on oxidized silicon. These are not limiting values for the number of layers that can be formed with this chemistry as there is no evidence that would suggest any decrease in reactivity with the addition of polymer layers. Measurements are presented of the ellipsometric thickness as a function of the number of layers in FIGS. 3A and 3B. Each data point represents the average of 27 measurements using optical null elipsometry (Rudolph Auto-EL II). Because the true refractive indices of the system are unknown, n=1.54+0i was used as the refractive index for the calculation of thicknesses. This value of n has been used for other zirconium/polymer (ZP) systems. For poly(NPM-VEP), the slope of the line is 16.0±0.9 Å with an intercept of 9.8±5.5 Å (FIG. 3A). The intercept corresponds to the thickness of the oxidized layer on the Si substrate. For poly(NBM-VEP), a thickness of 31.7±1.3 Å per layer with an intercept of 12.2±6.7 Å was determined (FIG. 3B).

Figures 4A, 4B:
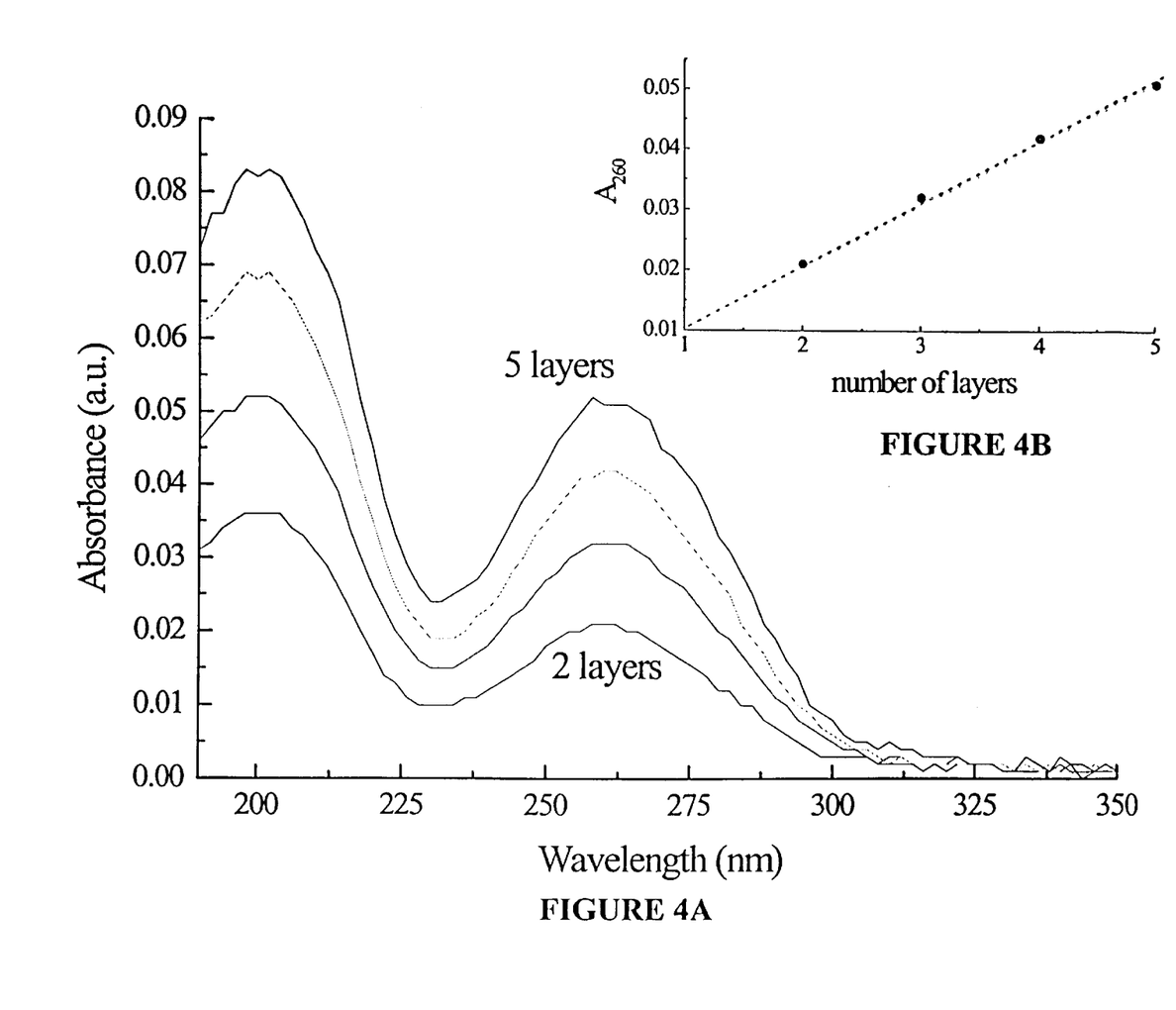
FIG. 4A is an absorbance spectra of poly(NBM-VEP) with structures from 2–5 layers.
FIG. 4B is a graph showing the relationship between absorbance and the number of layers at 260 nm.

The ellipsometric thickness data for these two polymer films can be used in concert with absorption and FTIR data to provide some insight into the organization of the layers. The most obvious conclusion that can be drawn from these data is that simple steric factors play an important role in determining the morphology of the individual layers. The observed linear increase in thickness with number of layers for poly(NBM-VEP) is consistent with the linear dependence of the film absorbance on number of layers for films grown on a quartz substrate (FIG. 4A). The absorptive resonance centered at 260 nm is associated with the N-succinimidobiphenyl chromophore. Finding a linear relationship between film thickness and number of layers is certainly not a surprising result for simple ZP systems where the organobisphosphonate layer constituents are arranged in a sufficiently orderly manner to allow quantitative predictions of layer thickness to be made and verified experimentally. For the polymers of the present invention, where the layer structure and interlayer bonding arrangements are expected to be highly irregular, it is therefore surprising to find that the layer growth appears to be so regular (FIG. 4B). The simplest interpretation of these data is that the linear alternating copolymers lie approximately flat on the interface surface and the density of the layers is significant. The density can be estimated from the absorbance measurements. For substituted biphenyl chromophores, the extinction coefficient of the 260 nm resonance is typically on the order of ~18,000 L/mol cm. Berlman, I. B., *Handbook of Fluorescence Spectra of Aromatic Molecules, Second Edition*, Academic, New York (1971). This value for the extinction coefficient corresponds to an absorption cross section of $3×10^{-17}$ $cm^2$/chromophore. The data shown in FIG. 4B yield an absorbance of 0.01 per bilayer (single layer on each side of the substrate), consistent with a surface density of $1.65×10^{14}$ chromophores/$cm^2$-layer. If half of the polymer phosphonate groups are hydrolyzed at the time of deposition, the interlayer bonding density would be ~$8×10^{13}$/$cm^2$-layer. Modeling a silica surface as a cubic close packed array of silanols with a 5 Å separation between silanol groups yields a surface silanol density of $4×10^{14}$ sites/$cm^2$. This simple calculation certainly overestimates the silanol density for a flat surface and at the same time fails to account for surface roughness, and these two oversimplifications act in opposition to one another. Given that this is intended to be a qualitative estimate, the agreement between measured chromophore density and estimated bonding site density is surprising, and it suggests that something on the order of a third of the available bonding sites on the substrates are occupied.

Figure 5:
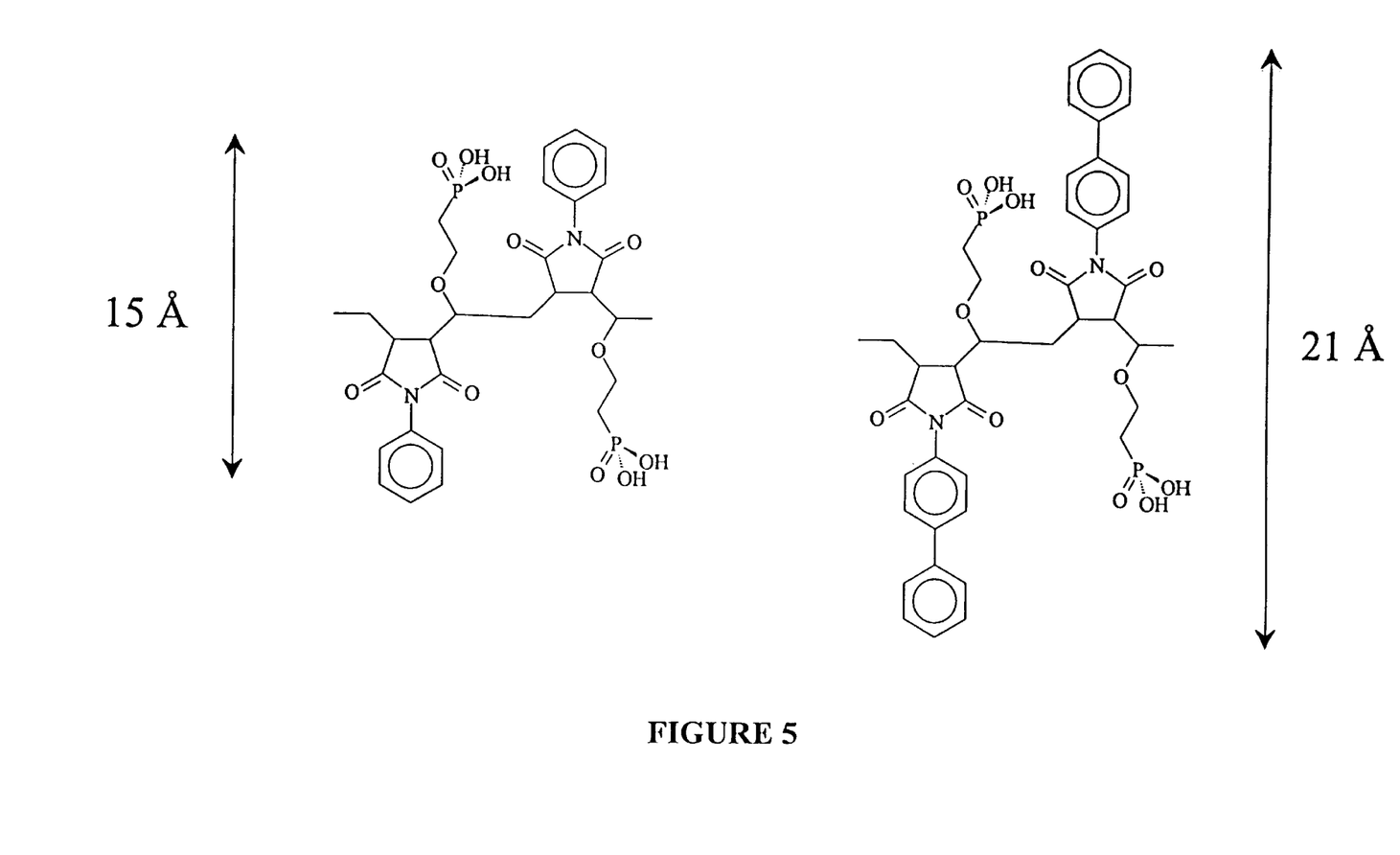
FIG. 5 is a schematic representation of poly(NPM-VEP) and poly(NBM-VEP)

If the estimate of polymer layer density is close to correct, the measured thickness of 16 Å/layer for poly(NPM-VEP)

and 31 Å/layer for poly(NBM-VEP) suggests that on average, each polymer layer is about one molecule thick. Molecular mechanics calculations on the basic oligomer unit suggest a 15 Å per layer thickness for the poly(NPM-VEP) and 21 Å per layer for poly(NBM-VEP), as indicated in FIG. 5. It is likely that the thicknesses measure, that are greater than those predicted by molecular mechanics calculations, are reflective of the complex and entangled structure of the polymer molecules within each layer.

An important consideration for these materials is the nature of the ZP chemistry used to connect polymer layers. One way to determine the nature of interlayer bonding is through XPS measurements of the layer constituents. The XPS data reported here (FIGS. 6A and 6B) suggest that the $Zr(PO_3R)_2$ layers are very similar for polymer and alkanebisphosphonate multilayers. For ZP multilayers formed using bisphosphonated alkanes, the spacing between the active phosphonate sites is determined either by the substrate or by the organic gallery constituent but, in either case, phosphonate groups are sufficiently close to allow the formation of $Zr(PO_3R)_2$ sheets that resemble the structure of solid $Zr(PO_3R)_2$.

Figure 6A:
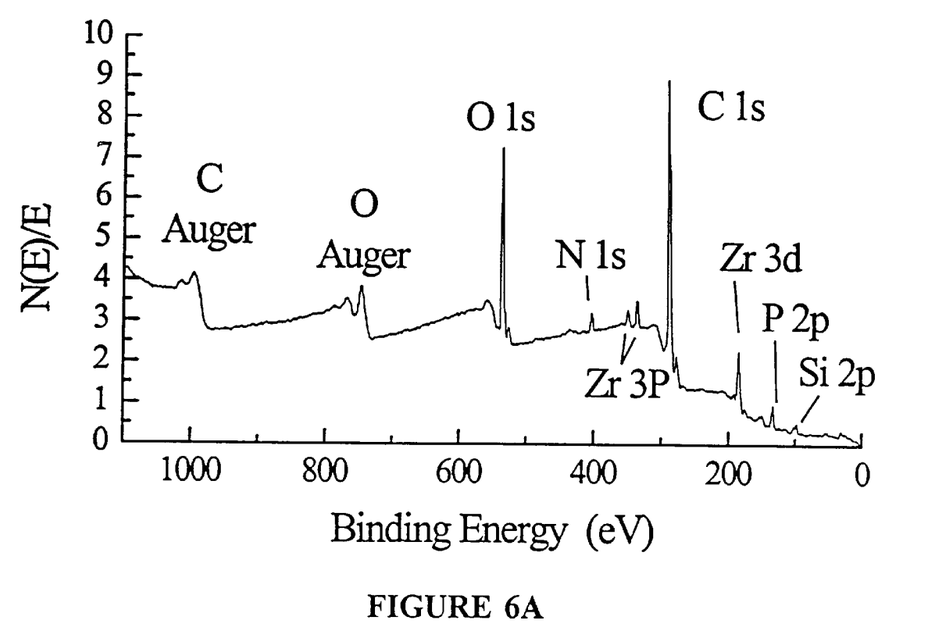
FIG. 6A is an x-ray photoelectron spectroscopic (XPS) survey scan of layers of poly(NPM-VEP)

FIG. 6A shows a survey scan of an 8-layer film of poly(NPM-VEP) on an oxidized Si substrate. Assignment of the peaks is: Si (2p resonances at 98.7 eV for elemental Si and 102.5 eV for $SiO_x$), P (2s at 191.5 eV, 2p at 135 eV), Zr ($3d_{5/2}$ at 183.5 eV, $3d_{3/2}$ at 185.8 eV), C (1s at 285 eV and 289 eV), N (1s at 401.5 eV), O (1s at 532.5 eV). In addition, there are Auger resonances for O at ~750 eV and C at ~1 KeV.

There are indications of changes in the interface thickness as a function of layer addition through the elemental ratios. As the number of poly(NPM-VEP) layers increases, a change in the relative amount of $Zr^{4+}$ from 0.46% for a monolayer to 3.27% for 8 layers was observed. Also observed was a change in the C1s/Si2p ratio, which varies from 3.3 for a monolayer to 22.0 for 8 layers. Both pieces of information confirm layered growth. For the Zr data, the change in measured composition was not due to changes in the metal ion loading density, but rather was a consequence of the screening of the substrate by the polymer layers.

Figure 6B:
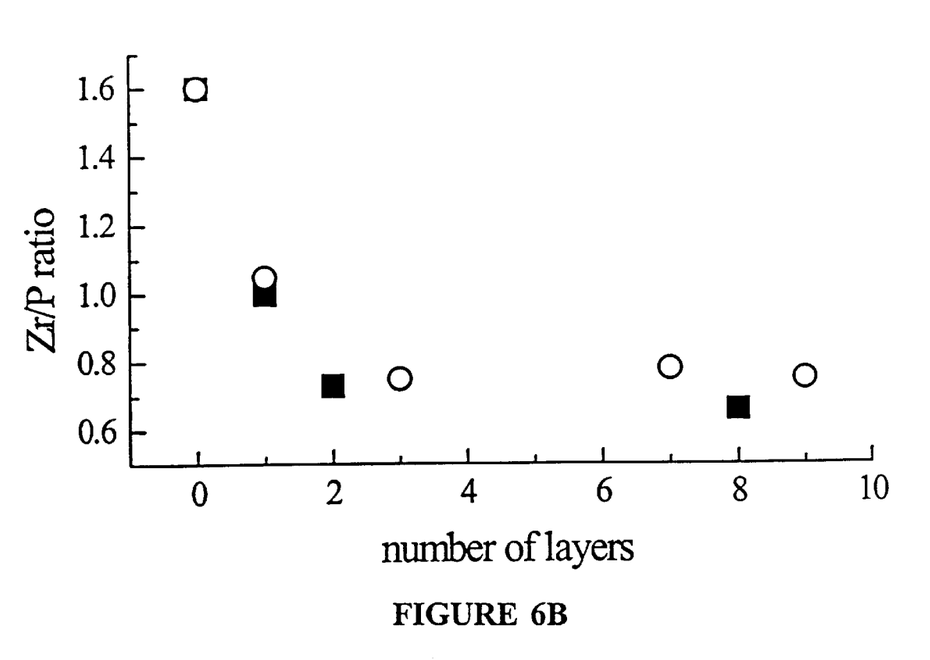
FIG. 6B is a graph showing the Zr/P ratio determined from XPS data as a function of the number of layers.

Information can be extracted on the interlayer chemistry from the XPS Zr/P ratio. It has been reported that, for up to 3 layers of 1,10-decanediylbis(phosphonic acid) on carbon fibers, the experimental Zr/P ratio is ~1.1. Hoekstra, K. J. et al., Chem. Mater. 8:1865 (1996). They have calculated the Zr/P ratio for an ideal system with stoichiometric amounts of Zr and P and have reported that the measured ratio should decrease from ~1 for a monolayer to about 0.6 for a 3-layered structure. Alternatively, a Zr/P ratio of 0.63±0.08 for multilayers formed from a-Zr phosphonate and polycation polymer layered structure has been calculated, where an inelastic mean free path of 15 Å for both Zr and P photoelectrons was used. Kim, H. et al., Chem. Mater. 9:1414 (1997). The polymer multilayers of the present invention have a layer-dependent Zr/P ratio that is consonant with these predictions. The data for poly(NPM-VEP) show the same elemental ratio as that for multilayers of 1,12-dodecanediylbis(phosphonic acid). These data are shown in FIG. 6B. The Zr/P ratio decreases as the number of layers increases for both systems. For a phosphonated and zirconated substrate, a Zr/P ratio of 1.6 was formed for each substrate. This ratio is the same for direct phosphonate-primed substrates as described herein compared to those primed using the traditional aminopropylsilane chemistry. These results suggest that the phosphonate group density is substantially the same for both surface treatments. It is also noted, that the elemental ratios recovered depend on stoichiometry, layer thickness and mean free path of the X-ray photoelectrons. For a single polymer layer a Zr/P of 1 is formed, which decreases to 0.66 for 8 layers. The data are fully consistent with other reports on the Zr/P ratio in similar systems, and based on these data, it appears that the interlayer bonding for the polymer multilayers is the same as for the presumably more ordered Zr-DDBPA layers. These XPS data are also significant in that they demonstrate the ability to react the protected isopropyl phosphonate functionalities of the polymer of the present invention stoichiometrically. This was a concern due to the statistical nature of the hydrolysis/deprotection chemistry used.

To test the stability of the poly(NPM-VEP) and poly (NBM-VEP) multilayers, films of both polymers were immersed for 2 hours each in n-hexadecane at ~100° C. and in boiling ethanol. These solvents were chosen to test the solubility of the polymers in both polar and nonpolar environments. In all cases, no change in either ellipsometric thickness or FTIR spectra resulting from exposure to solvent was found. This result is consistent with ZP multilayers formed from small molecules. IT is believed that the primary reason for the insolubility of the polymer multilayers is the same as that for the small molecule systems; the $Zr(O_3PR)_2$ structure is characterized by its sparing solubility in most solvents.

Figure 7:
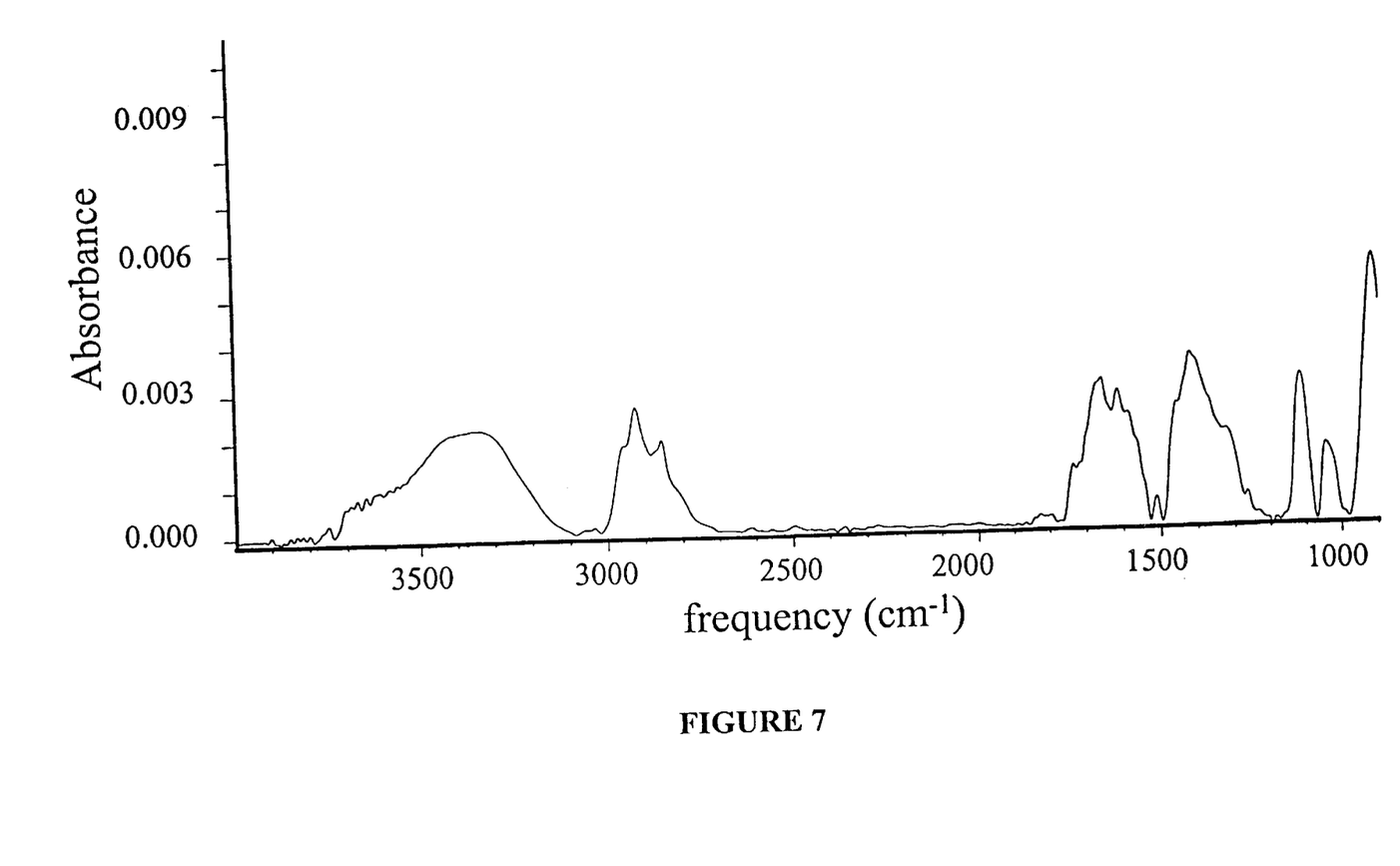
FIG. 7 is an FTIR spectrum of a bilayer of poly(NPM-VEP) on oxidized Si.
Figure 8:
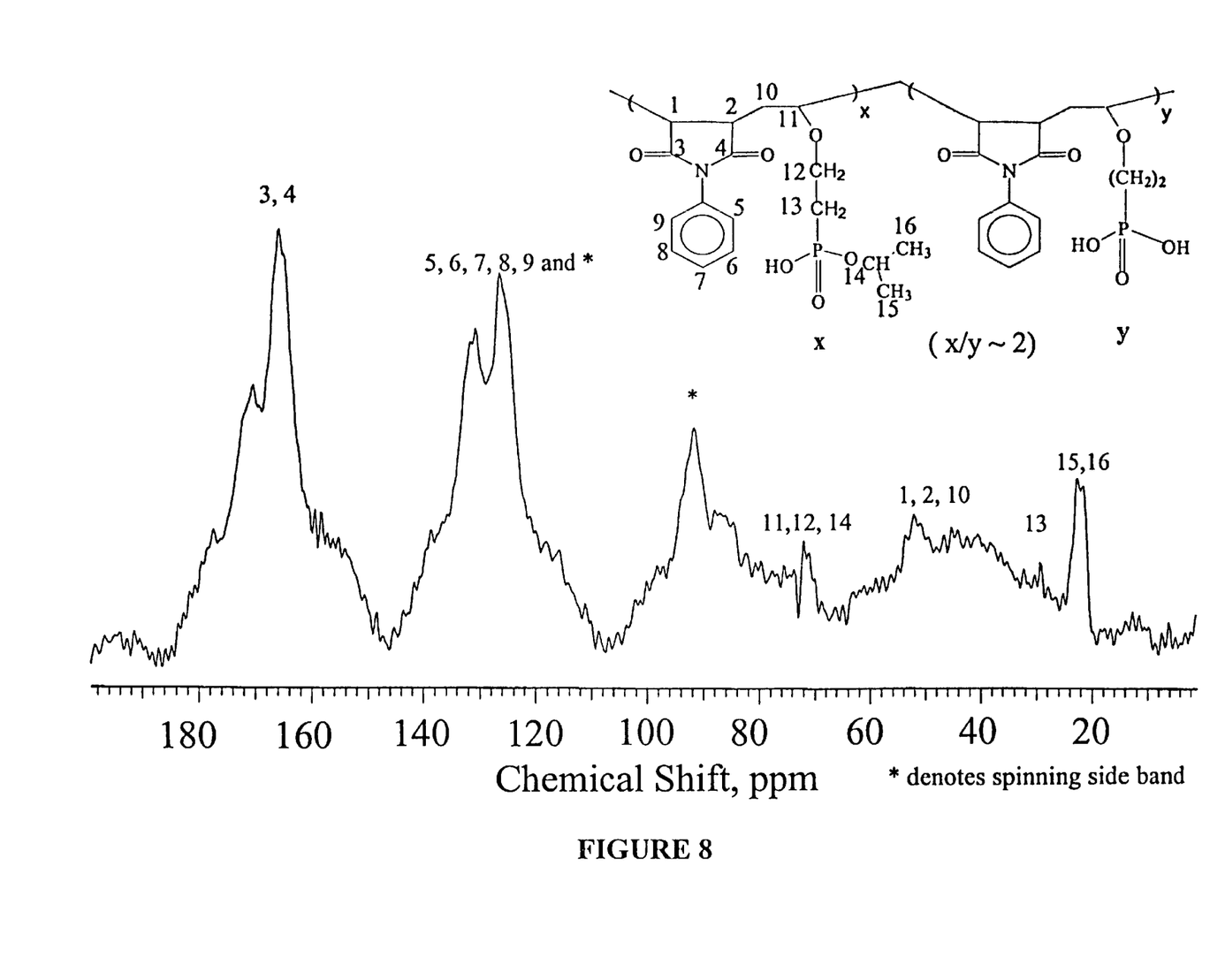
FIG. 8 is a $^{13}C$ spectrum of poly(NPM-VEP) grown on high surface area porous silica.

It is important to characterize the polymers within the multilayer structure. The FTIR spectrum of a bilayer of poly(NPM-VEP) adsorbed on a Si substrate is shown in FIG. 7. The bands in the 2700 $cm^{-1}$–3100 $cm^{-1}$ region are the CH stretching resonances. While there is a substantial body of literature relating band position to layer structure for alkanethiols on gold, the analogous information is not available from the data for this polymer because of the relatively small amount of aliphatic $CH_2$ functionality in this system. Carbonyl group stretching resonances are seen in the ~1700 $cm^{-1}$–1800 $cm^{-1}$ region and the P=O and P—O bands lie in the 1000 $cm^{-1}$–1200 $cm^{-1}$ range. While these data confirm the presence of the functional groups and are consistent with the formation of layers of poly(NPM-VEP), there is little explicit structural information on the polymer contained within them. In an effort to better understand the nature of the polymer layers, $^{13}C$ and $^{31}P$ CPMAS NMR spectra were acquired of copolymers on high surface area silica. The procedure and conditions for adsorption of poly (NPM-VEP) layer on silica having a surface area of 450 $m^2/gm$ are same as described above for the adsorption of polymer on Si substrate except that the silica mixture was stirred during phosphorylation, zirconation and deposition of polymeric layers. The $^{13}C$ CPMAS spectrum of poly (NPM-VEP) adsorbed on silica is shown in FIG. 8. The resonances in the region of 10–50 ppm belong to the aliphatic carbons in the polymer backbone and side chains. The carbonyl—and phenyl—carbon resonances associated with the N-phenylsuccinimide moiety are observed in the 150–180 ppm region and 120–140 ppm region, respectively. The form of these data, especially the absence of discernible progressions, suggests that poly(NPM-VEP) is an alternating copolymer. It is recognized that the characterization of poly(NPM-VEP) copolymerization by NMR is limited by the spectral linewidths, but these findings are consistent with the fact that neither monomer homopolymerizes under the given experimental conditions.

The characterization of the polymer layers using optical null ellipsometry, FTIR and $^{13}C$ NMR demonstrates the presence of multiple polymer layers. It is also important to evaluate the extent to which these layers resist chemical and thermal exposure. A ten-layer sample was used for these experiments. Exposure of this sample to boiling ethanol (78° C.) for one hour and to boiling hexadecane (120° C.) for two hours produced no significant changes in ellipsometric thickness or FTIR spectra. These data indicate significant mechanical and chemical stability for these layers.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

All references cited herein are incorporated by reference as if fully set forth.

We claim:

1. An alternating copolymer comprising repeat units having the formula:

wherein m is an integer greater than or equal to 0, n is an integer equal to at least 1, R is a protecting group removable with trimethylsilane, and R' is H, alkyl, aryl, or an organic acid.

2. The copolymer of claim 1, wherein R' is phenyl, biphenyl or p-benzoic acid.

3. The copolymer of claim 1, wherein m is from 0 to 4.

4. The copolymer of claim 1, wherein n is from 1 to 5.

5. The copolymer of claim 1, wherein R is methyl, ethyl or isopropyl.

6. An alternating copolymer comprising repeat units having the formula:

wherein m is an integer greater than or equal to 0, n is an integer equal to at least 1, R' is H, alkyl, aryl, or an organic acid, and R is H or a protecting group removable by treatment with trimethylsilane.

7. The copolymer of claim 6, wherein the copolymer is poly(N-phenylmaleimide-(2-vinyloxy)ethylphosphonate.

8. The copolymer of claim 6, wherein the copolymer is poly(N-biphenylmaleimide-(2-vinyloxy)ethylphosphonate.

9. An alternating copolymer obtained by copolymerization of an N-substituted-maleimide and a vinyl ether phosphonate, wherein the N-substituted maleimide is alkyl-substituted, aryl substituted, or organic acid substituted.

10. The copolymer of claim 9, wherein the N-substituted-maleimide is N-phenyl-maleimide, N-biphenyl-maleimide or N-(p-benzoic acid)-maleimide.

11. The copolymer of claim 9, wherein the vinyl ether phosphonate has the formula:

$$CH_2=CH(CH_2)_mO(CH)_nP^+(OR)_3$$

wherein m is greater than or equal to 0, n is at least 1 and R is a protecting group, which is removable by treatment with trimethylsilane.

* * * * *

UNITED STATES PATENT AND TRADEMARK OFFICE
CERTIFICATE OF CORRECTION

PATENT NO. : 6,528,603 B1 Page 1 of 1
DATED : March 4, 2003
INVENTOR(S) : Gary J. Blanchard and Punit Kohli It is certified that error appears in the above-identified patent and that said Letters Patent is hereby corrected as shown below:

Column 1,
Line 51, "CAD, G." should be -- Cao, G. --.
Line 61, after "Chem." delete "Macromol.".

Column 4,
Line 32, "1" should be -- I --.

Column 7,
Line 6, "(300 MHz, $d_6$DMSO)" should be -- (300 MHz, $d_6$-DMSO) --.

Signed and Sealed this

Ninth Day of March, 2004

JON W. DUDAS
*Acting Director of the United States Patent and Trademark Office*